United States Patent Office 2,956,888
Patented Oct. 18, 1960

2,956,888
CHROME PROTECTOR

Paul E. Gunning, Kenmore, N.Y., assignor to Union Carbide Corporation, a corporation of New York No Drawing. Filed Jan. 20, 1959, Ser. No. 787,839

8 Claims. (Cl. 106—10)

This invention relates to aqueous emulsions of wax for protecting chrome and steel surfaces. In particular, it relates to a waxing composition for use on automobile chrome parts.

There are three types of compositions for chrome protection: wax dispersions in organic solvents, cleaning compositions which leave a residual protective film and solvent plastic mixtures which leave a protective film. The wax dispersions in solvents such as mineral spirits are suitable for both cellulosic finishes, glass surfaces and chrome surfaces. The cleaners which leave a residual protective film are similar to abrasive cleaners except that they contain a wax or silicone which allegedly leaves a protective film to prevent further rusting. These cleaner compositions which contain protective wax coating materials leave much to be desired in their cleaning action. The solvent plastic mixture type of chrome protector leaves a thick unsightly film which is difficult to apply, frequently fails to prevent rusting and subsequently peels. Plastic coatings are believed to be generally unpopular with car owners.

By the process of this invention a wax-silicone formulation is provided which gives much better protection to chrome and steel without altering the brightness of the specimen. The composition of this new formulation is as follows:

| Ingredient | Weight-Percent | |
|---|---|---|
| | (preferred) | (range) |
| Gersthofen Wax "OP" | 3.0 | 2.5 to 3.5. |
| Gersthofen Wax "S" | 1.5 | 1.25 to 1.75. |
| Barium Dinonylnaphthalene Sulfonate (Barium Petronate). | 2.0 | 1.75 to 2.25. |
| Silicone Oil, L-45 (10,000 centistokes) | 3.0 | 2.5 to 3.5. |
| Morpholine | 2.0 | 1.75 to 2.25. |
| Oleic Acid | 3.0 | 2.5 to 3.5. |
| Snowfloss | 5.0 | 4 to 6. |
| Mineral Spirits | 30.0 | 25 to 35. |
| Water | 50.5 | 45 to 55. |

The "Gersthofen" waxes employed in the chrome protector formula are made in Germany and are synthetic products made from certain natural waxes as the basic raw material. The natural waxes are obtained by extraction from brown coal of Germany. The crude wax from the coal is called montan wax and is principally a mixture of high molecular weight aliphatic carboxylic acids sometimes called montanic acid. The montan wax is modified by such techniques as saponification. The specific waxes employed in this formula are described in "The Chemistry and Technology of Waxes," second edition, New York, Reinhold Publishing Corporation, 1956, p. 462. "Gersthofen Wax S" is essentially a wax of high montanic acid content in the free state, and is highly saponifiable. "Gersthofen Wax OP" is the butylene glycol ester of wax "S" saponified with calcium hydroxide.

The Gersthofen waxes used have the following analyses:

| | Gersthofen Wax "OP" | Gersthofen Wax "S" |
|---|---|---|
| Melting Point, °C | 102–106 | 80–83 |
| Acid No | 10–15 | 145–160 |
| Unsaponifiable, percent | 7–10 | 7–10 |
| Saponification Number | 110–125 | 165–185 |

The barium petronate is used as a 45 to 55%, preferably 50% dispersion, in light naphtha and is the corrosion inhibitor in this formula. It is exceptionally effective in the presence of sodium chloride and moisture.

The light naphtha in which the barium petronate is dispersed has an API gravity at 60° F. of 65 to 75, and an aniline cloud point of 1.30 to 1.40° F.

The silicone oil which is an 8,000 to 12,000, preferably 10,000, centistokes dimethyl polysiloxane, allows the dried chrome protector formulation to be wiped off easily. This silicone oil is highly viscous and also acts synergistically with the barium petronate to give increased corrosion protection. The oleic acid and morpholine in this formulation act as emulsifiers. The oleic acid acts synergistically with the barium petronate and silicone oil to give increased corrosion protection.

Snowfloss which is a hydrated silica is included in this formulation because it assists in polishing the dried protector. The mineral spirits are included to dissolve the wax and oil which form the oil phase of the emulsion. The mineral spirits have no effect on automobile finishes. Water coacts with the emulsion system to give a non-settling product.

The mineral spirits are petroleum fractions having an API gravity at 60° F. of 48 to 54, and an aniline cloud point of 130 to 150° F.

The foregoing formulation may be prepared by combining the weighed proportions of silicone oil, oleic acid, wax, barium petronate and 25% of the total mineral spirits with stirring at a temperature of 90° C. until all the wax is dissolved. Then the balance of the mineral spirits is added and the solution allowed to cool to 70° C. Water is then placed in a separate vessel at 70° F. The Snowfloss is then added in small portions to the water until a smooth slurry results. Morpholine is then added to the aqueous solution and the hot solvent solution is added to the water solution with vigorous agitation. An emulsion is formed. The rate of addition of the oil phase is governed by the rate at which the water can take up the oil. The emulsion should have a creamy homogeneous appearance at all times. Agitation is continued for at least 10 minutes after the addition of all the oil. The final temperature of the mixture of polish should be about 40° C. The polish is then allowed to cool to room temperature.

In accelerated laboratory tests the aforementioned emulsion was wiped onto chrome and steel coupons and subjected to several laboratory screening tests. One such test involves spraying the coated coupon with 5% calcium chloride solution and placing it in a humidor a 100% relative humidity, for varying periods of time. The following table, showing comparative results on coated and uncoated steel specimens, illustrates that the steel specimens with no coating show rusting under the salt solution droplets within a few hours. The coated specimen was in good condition after 5 days.

Table I

|  | Exposure | Percent Rust | Appearance After Cleaning |
|---|---|---|---|
| Uncoated Steel | 6 hours | 100 | Poor. |
| Protected Steel | 5 days | 10 | Good. |

Further tests showed somewhat less protection when no Silicone L-45 was used and very poor protection for the controls when either oleic acid, barium petronate, or the wax was eliminated from the formula.

The relationship between acid number of a formula and protection afforded steel specimens was observed in many tests and formulas. Generally better protection was afforded if the acid number was within a range of 110–150. The desired acid number is attained by adjusting the proportions of the wax, its ester, and the oleic acid contents.

Tests were made with five formulas applied to steel specimens from water-morpholine-solvent emulsions with no other component present than those indicated. More rust formation is observed on the specimens treated with the lowest and highest acid number formula and the least rust formation occurred on the specimen treated with the formula having an acid number within the 110–150 range.

To improve the emulsion stability of the product during extended storage under varying conditions, 2½ wt.-percent of isopropanol was substituted for an equivalent amount of water making the water content 48.0%. The isopropanol content may be from 1½ to 3½ wt.-percent.

Another test specifically devised for chrome plated specimens and published in the S.A.E. proceedings, 1956, pp. 50–55, involves the preparation of a chrome plated coupon by rubbing on a mixture of cupric nitrate, ferric chloride, ammonium chloride, and kaolin clay in paste form and subjecting the coated specimen to a high humidity atmosphere. The results of this test show that unprotected chrome developed 75% rust in 24 hours whereas protected chrome showed only 10% rust under identical conditions after 24 hours.

What is claimed is:

1. Aqueous emulsion of wax for protecting chrome and steel surfaces, consisting essentially of wax, by weight 1.75 to 2.25% barium dinonyl sulfonate, 2.5 to 3.5% dimethyl polysiloxane, 1.75 to 2.25% morpholine, oleic acid, 4 to 6% hydrated silica, 25 to 35% mineral spirits, and the remainder water, the proportions of said wax and said oleic acid being adjusted to an acid number within the range of 110–150.

2. Aqueous emulsion of wax for protecting chrome and steel surfaces, consisting essentially of by weight 3.75 to 5.25% wax of a high montanic acid content in the free state, 1.75 to 2.25% barium dinonyl sulfonate in a 45 to 55% dispersion in light naphtha, 2.5 to 3.5% dimethyl polysiloxane, 1.75 to 2.25% morpholine, 2.5 to 3.5% oleic acid, 4 to 6% hydrated silica, 25 to 35% mineral spirits, and the remainder water.

3. Aqueous emulsion of wax for protecting chrome and steel surfaces, consisting essentially of by weight 2.5 to 3.5% wax of a high montanic acid content in the free state, 1.25 to 1.75% butylene glycol ester of said wax saponified with calcium hydroxide, 1.75 to 2.25% barium dinonyl sulfonate in a 45 to 55% dispersion in light naphtha, 2.5 to 3.5% dimethyl polysiloxane, 1.75 to 2.25% morpholine, 2.5 to 3.5% oleic acid, 4 to 6% hydrated silica, 25 to 35% mineral spirits, and the remainder water.

4. Aqueous emulsion of wax for protecting chrome and steel surfaces, consisting essentially of by weight 2.5 to 3.5% wax of a high montanic acid content in the free state, 1.25 to 1.75% butylene glycol ester of said wax saponified with calcium hydroxide, 1.75 to 2.25% barium dinonyl sulfonate in a 45 to 55% dispersion in light naphtha, 2.5 to 3.5% dimethyl polysiloxane, 1.75 to 2.25% morpholine, 2.5 to 3.5% oleic acid, 4 to 6% hydrated silica, 25 to 35% mineral spirits, and the remainder water, the proportions of said wax, its ester and said oleic acid being adjusted to an acid number within the range of 110–150.

5. Aqueous emulsion of wax for potecting chrome and steel surfaces, consisting essentially of by weight 3.75 to 5.25% wax, 1.75 to 2.25% barium dinonyl sulfonate, 2.5 to 3.5% dimethyl polysiloxane, 1.75 to 2.25% morpholine, 2.5 to 3.5% oleic acid, 4 to 6% hydrated silica, 25 to 35% mineral spirits, and 45 to 55% water.

6. Aqueous emulsion of wax for protecting chrome and steel surfaces, consisting essentially of by weight 3.75 to 5.25% wax of a high montanic acid content in the free state, 1.75 to 2.25% barium dinonyl sulfonate, 2.5 to 3.5% dimethyl polysiloxane, 1.75 to 2.25% morpholine, 2.5 to 3.5% oleic acid, 4 to 6% hydrated silica, 25 to 35% mineral spirits, and the remainder water.

7. Aqueous emulsion of wax for protecting chrome and steel surfaces, consisting essentially of by weight 2.5 to 3.5% wax of a high montanic acid content in the free state, 1.25 to 1.75% butylene glycol ester of said wax saponified with calcium hydroxide, 1.75 to 2.25% barium dinonyl sulfonate, 2.5 to 3.5 polysiloxane, 1.75 to 2.25% morpholine, 2.5 to 3.5% oleic acid, 4 to 6% hydrated silica, 25 to 35% mineral spirits, and the remainder water.

8. Aqueous emulsion of wax for protecting chrome and steel surfaces, consisting essentially of 3.75 to 5.25% wax, 1.75 to 2.25% barium dinonyl sulfonate, 2.5 to 3.5% dimethyl polysiloxane, 1.75 to 2.25% morpholine, 2.5 to 3.5% oleic acid, 4 to 6% hydrated silica, 25 to 35% mineral spirits, and 45 to 55% water, the water containing from 1½% to 3½% isopropanol.

References Cited in the file of this patent

UNITED STATES PATENTS

| 2,626,870 | Cooke et al. | Jan. 27, 1953 |
| 2,782,124 | Von Rosenberg et al. | Feb. 19, 1957 |
| 2,812,263 | Geen et al. | Nov. 5, 1957 |